United States Patent [19]

Swisher, Jr.

[11] Patent Number: 5,326,214
[45] Date of Patent: Jul. 5, 1994

[54] METHOD AND APPARATUS FOR HANDLING A CUTTER OR THE LIKE

[75] Inventor: George W. Swisher, Jr., Oklahoma City, Okla.

[73] Assignee: CMI Corporation, Oklahoma City, Okla.

[21] Appl. No.: 88,498

[22] Filed: Jul. 7, 1993

Related U.S. Application Data

[63] Continuation of Ser. No. 779,698, Oct. 21, 1991, abandoned.

[51] Int. Cl.$^5$ ............................................. B60P 1/02
[52] U.S. Cl. ...................... 414/495; 414/458; 414/917
[58] Field of Search ............... 414/495, 458, 459, 460, 414/917, 537, 546

[56] References Cited

U.S. PATENT DOCUMENTS

| | | | |
|---|---|---|---|
| 2,858,950 | 11/1958 | Martin | 414/495 |
| 3,135,401 | 6/1964 | Schramm | 414/495 X |
| 3,322,292 | 5/1967 | Bogh et al. | 414/495 |
| 3,346,131 | 10/1967 | Lundell | 414/495 X |
| 3,517,944 | 6/1970 | Hage | 414/495 X |
| 3,631,999 | 1/1972 | Walerowski | 414/495 X |
| 3,815,768 | 6/1974 | Goodwin | 414/458 |
| 4,302,022 | 11/1981 | Schoeffler et al. | 414/495 X |
| 4,570,959 | 2/1986 | Grinwald | 414/458 X |
| 4,819,955 | 4/1989 | Cobb | 414/458 X |
| 4,863,334 | 9/1989 | Girerd | 414/458 |

Primary Examiner—Michael S. Huppert
Assistant Examiner—James Eller
Attorney, Agent, or Firm—Dunlap, Codding & Lee

[57] ABSTRACT

A handling and transporting apparatus having a lifting and lowering frame supported by hydraulically actuated parallelograms at each end from transporting frames.

7 Claims, 5 Drawing Sheets

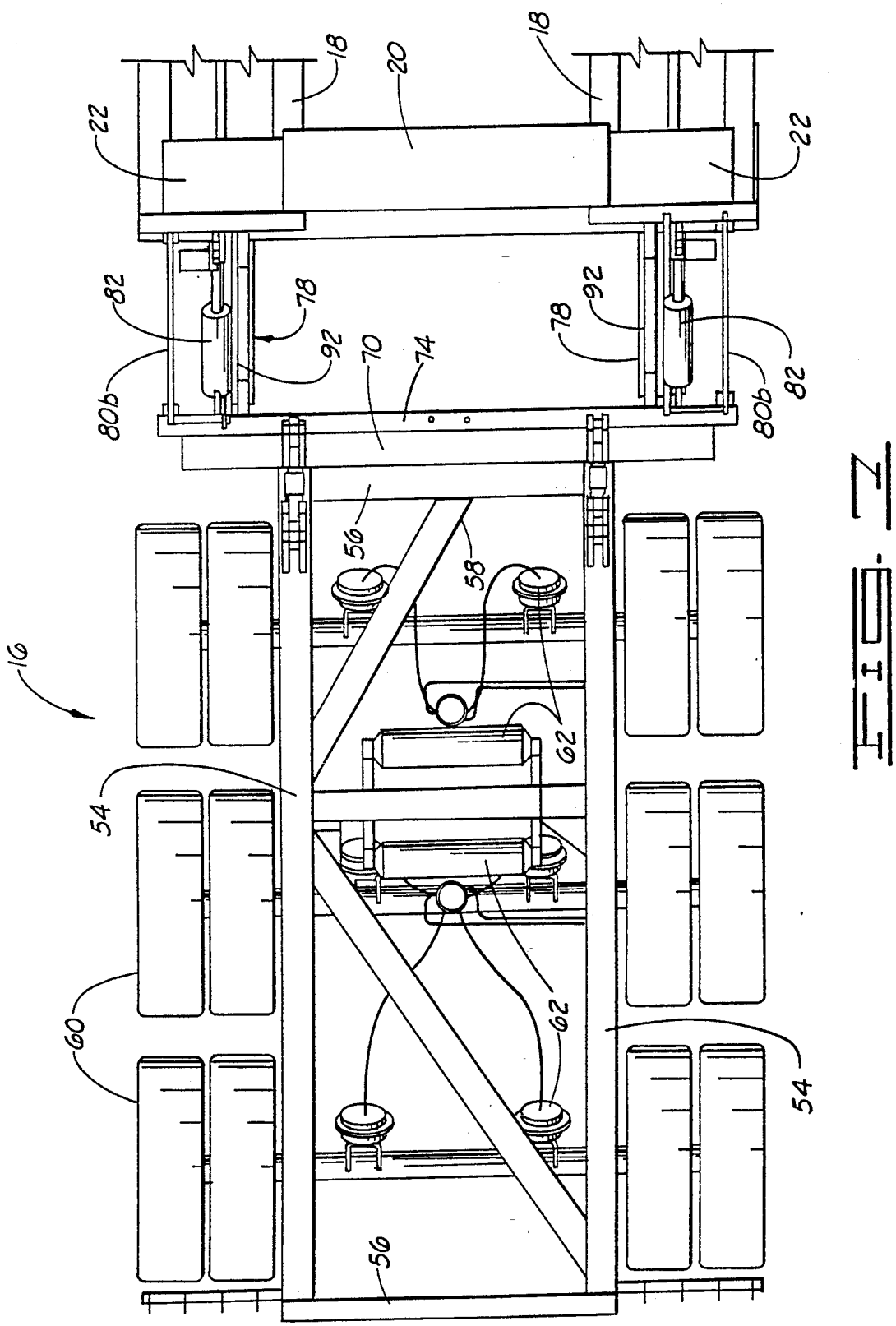

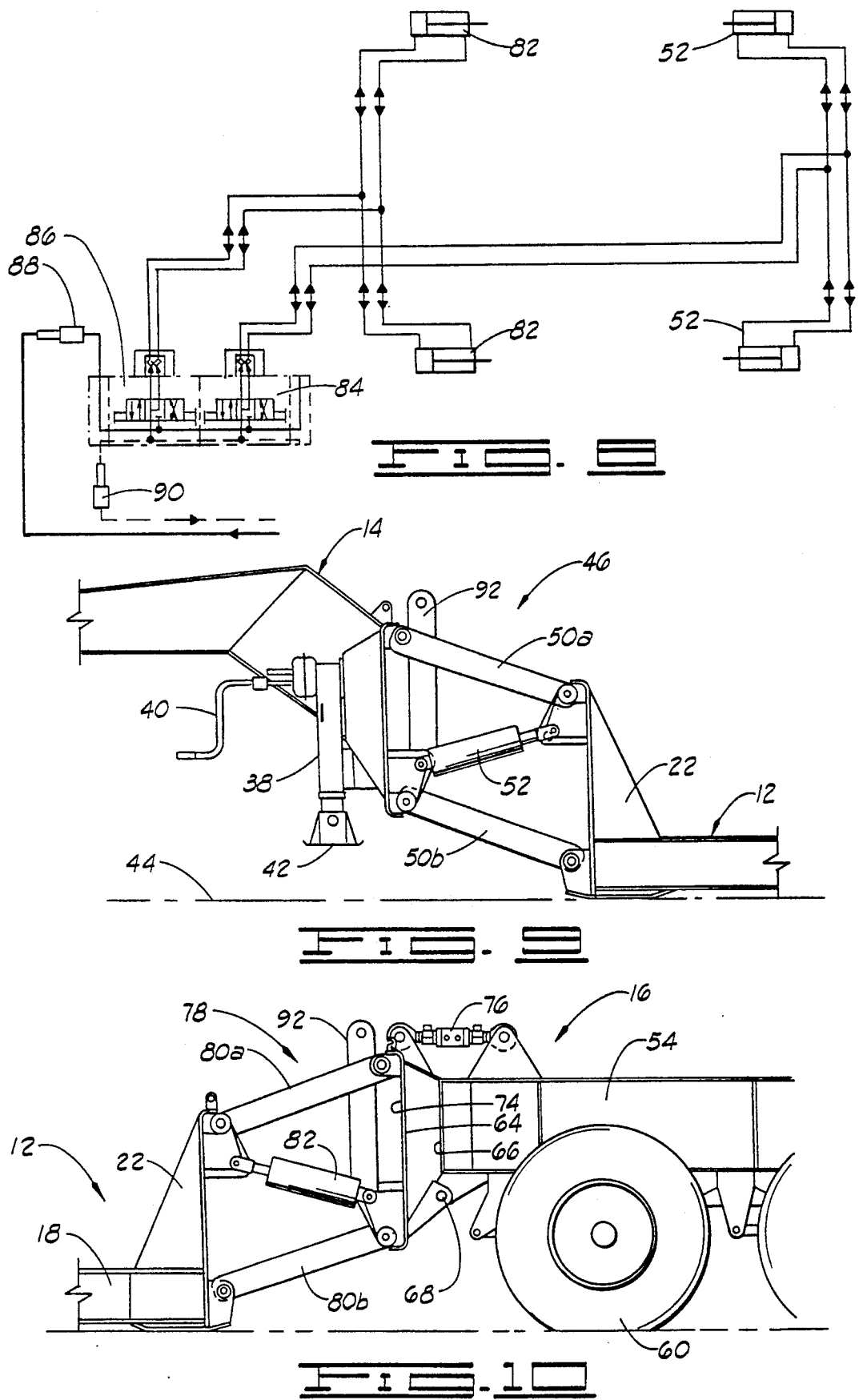

METHOD AND APPARATUS FOR HANDLING A CUTTER OR THE LIKE

This is a continuation of copending application Ser. No. 07/779,698, filed on Oct. 21, 1991, now abandoned.

BRIEF SUMMARY OF THE INVENTION

1. Field of the Invention

This invention relates to an apparatus and method for handling objects, and more particularly, but not by way of limitation, to an apparatus and method for use in installing, removing and transporting a cutter assembly of a milling machine.

2. Background Art

Milling machines used on roads, highways and airports have, in some cases, reached such a size that the machine must be partially disassembled in order to be transported. One of the most cumbersome components to move is the cutter assembly. Such an assembly may be twelve feet long, weigh several thousand pounds, and is usually mounted in the central portion of the machine. To remove such an assembly, it is necessary to raise the frame of the machine, disconnect the assembly from the frame of the machine, lower it, then move it lengthwise out from under the machine. Prior to this invention, there was not an effective way to accomplish this job.

BRIEF DESCRIPTION OF THE DRAWINGS

FIG. 3 is a view similar to FIG. 1 with the apparatus in a lowered position.

FIG. 6 is a side view of a portion of the transport frame assembly employed at the rear end of the apparatus.

FIG. 7 is a plan view of the second transport frame assembly with the tool box removed.

FIG. 8 is a schematic diagram of the hydraulic system for actuating the raising and lowering of the object being transported.

FIG. 9 is a side view of the first transport frame assembly in a lowered position.

FIG. 10 is a side view of a portion of the second transport frame assembly in a lowered position.

Figure 1:
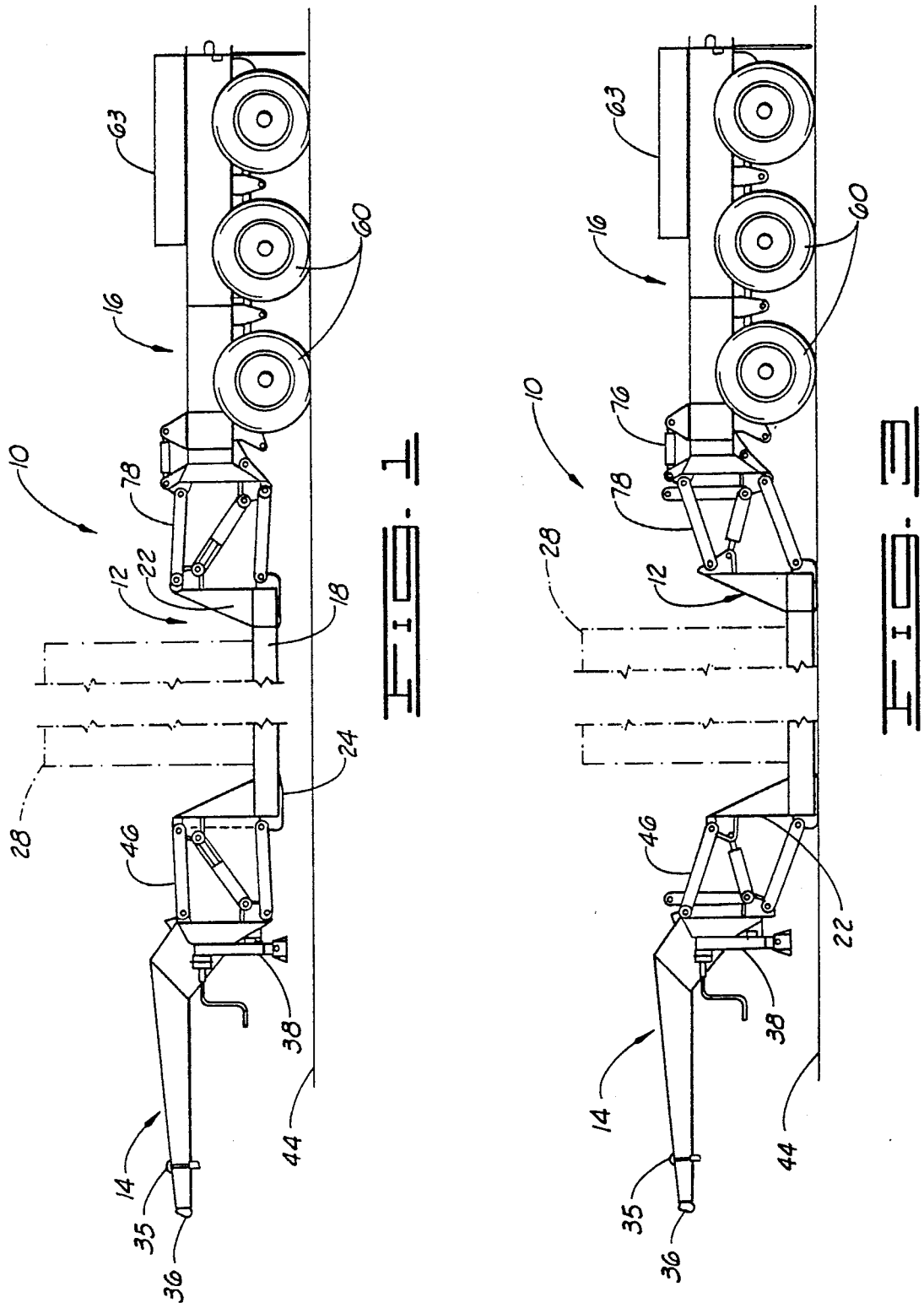
FIG. 1 is a side view of the complete transporting apparatus in a raised position for transporting a load.

Referring to the drawings in detail, and particularly FIG. 1, reference character 10 generally designates an apparatus constructed pursuant to this invention. The apparatus 10 basically comprises a lifting and lowering frame 12 connected between the first or front transport frame 14 and the second or rear transport frame 16.

The lifting and lowering frame 12 is a rectangular structure having side rails 18 (FIGS. 4-7) interconnected by end rails 20. A vertical column 22 is provided at each corner of the lifting and lowering frame 12 and a skid 24 is provided at the lower end of each column 22. The frame 12 is sized to support whatever load may be necessary, such as load 28 indicated by dash lines in FIG. 1. In one application of the present invention, the load 28 is the cutter mechanism of a large milling machine of the type used for milling off the top surface of portland and asphalt concrete roadways. Such a cutter mechanism can be, for example, 12 feet long and weigh several thousands of pounds. The lifting and lowering frame 12 may be modified to eliminate the side rails 18, with the end rails 20 and columns 22 attached directly to the ends of the load 28.

Figure 4:
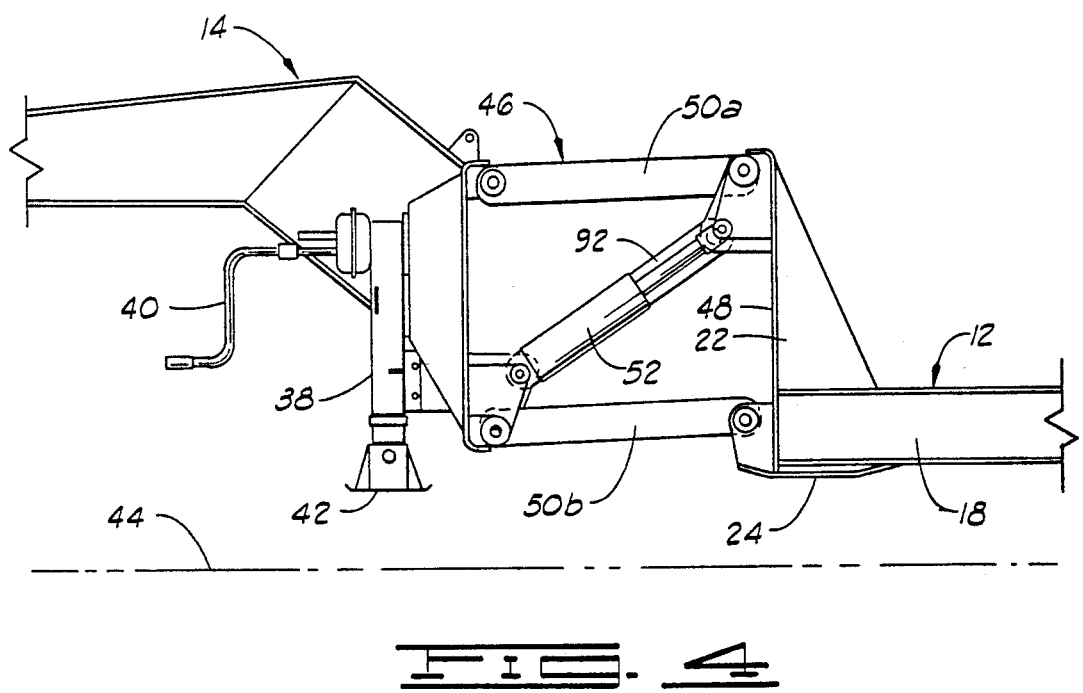
FIG. 4 is an enlarged side view of a portion of the first transport frame assembly which is used at the forward end of the apparatus.
Figure 4:
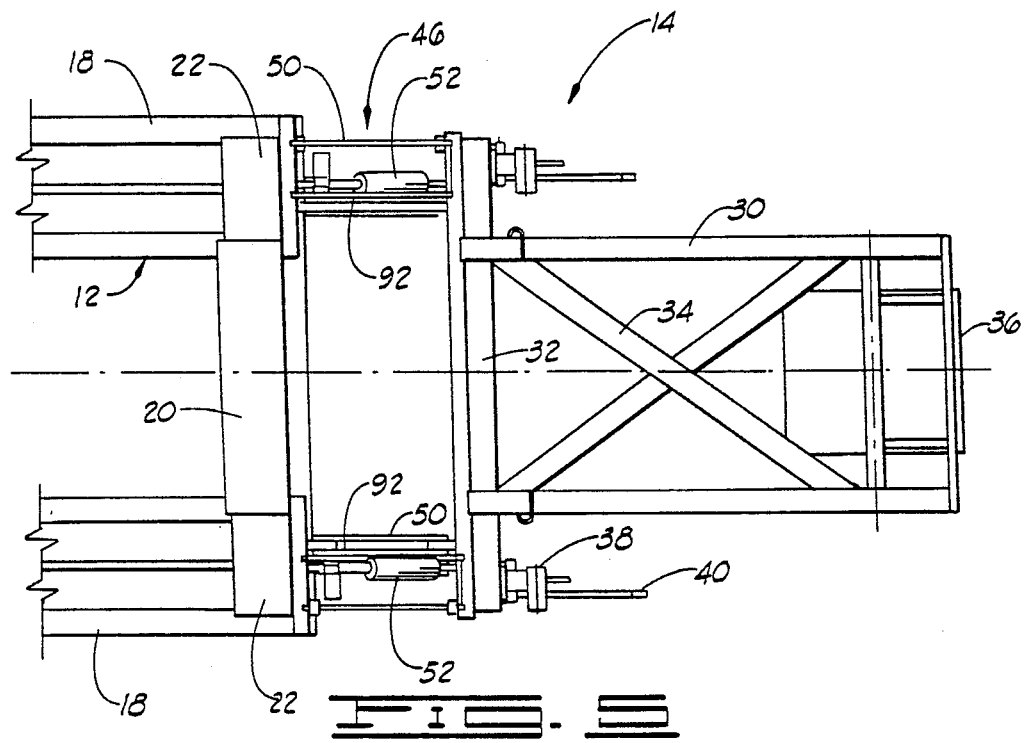
Figure 5:
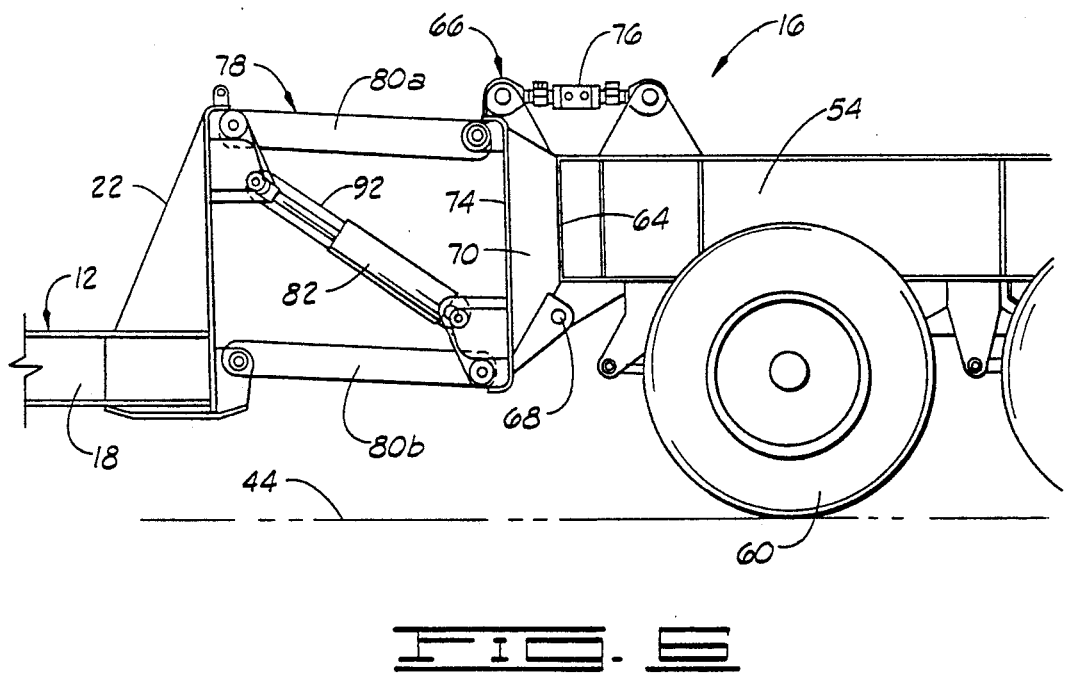
FIG. 5 is a top view of the assembly shown in FIG. 4.

As shown in FIGS. 4 and 5, the first or front transport frame 14 is also a generally rectangular structure consisting of parallel side beams 30, end beam 32 and cross beams 34 to provide a rigid structure. A suitable hitch 35 (FIG. 1) is provided near the forward end 36 of the front transport frame 14 for connection with the fifth wheel of a transporting tractor (not shown). The beam 32 extends outwardly beyond the side beams 30. A suitable jack assembly 38 is provided on the outer end portion of the rear beam 32. Each jack 38 is operated by a handle 40 for extending and retracting the jack 38, whereby the foot portion 42 of the jack 38 can be placed in engagement with the ground or other supporting surface 44 to support the forward end of the entire apparatus 10 when the apparatus 10 is in a stationary position.

A hydraulically actuated parallelogram 46 interconnects the first or forward frame 14 to what will be called the first end 48 of the lifting and lowering frame 12. The hydraulically actuated parallelogram 46 comprises upper and lower linkages 50a and 50b pivotally secured between the frame 14 and the first end 48 of the lifting and lowering frame 12 at each side of the frame 12. A pair of hydraulically actuated, double acting, cylinders 52 are also pivotally connected between the first frame 14 and the first end 48 of the lifting and lowering frame 12, there being a hydraulic cylinder 52 at each side of the apparatus 10. As shown in FIG. 4, the hydraulic cylinders 52 are secured at an angle extending generally upwardly from the lower end portion of the first frame 14 to the upper end portion of the respective vertical column 22 of the lifting and lowering frame 12, such that when the hydraulic cylinders 52 are retracted, the first end 48 of the lifting and lowering frame 12 will be lowered, and when the hydraulic cylinders 52 are extended, the first end 48 of the lifting and lowering frame 12 will be raised.

Figure 2:
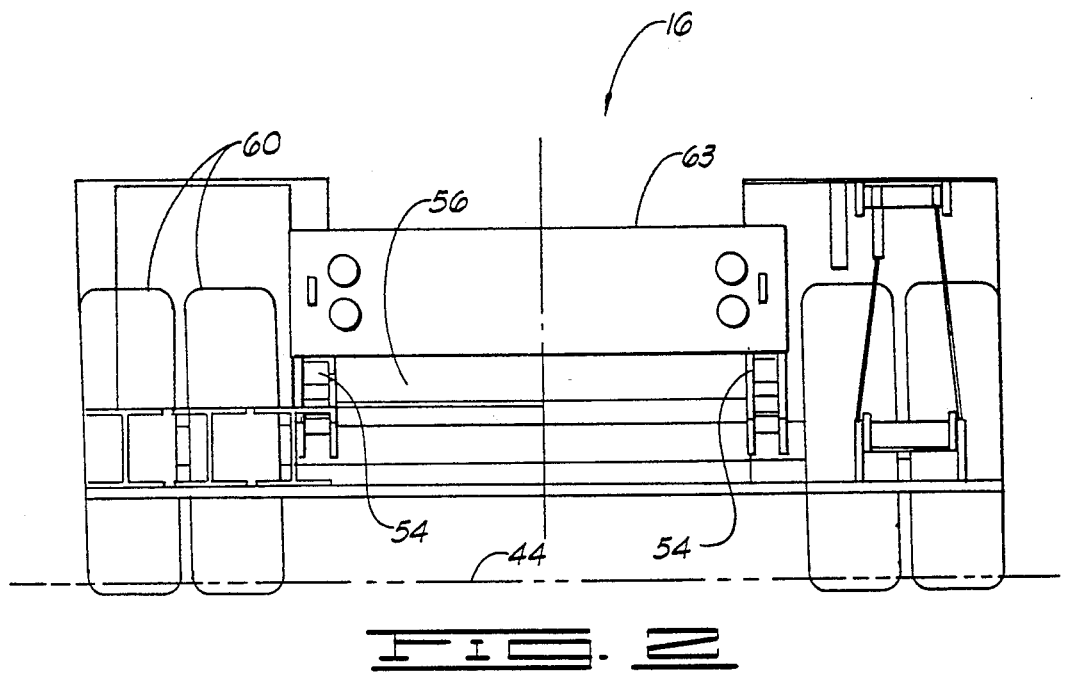
FIG. 2 is an enlarged end view taken from the right hand end of FIG. 1.

As shown most clearly in FIGS. 6 and 7, the second or rear transporting frame 16 is also a generally rectangular structure comprising side beams 54, cross beams 56 and diagonal beams 58 to provide a strong, rigid structure. The frame 16 is suitably supported by a running gear comprising a plurality of wheels 60, the number depending upon the size of the loads to be transported by the apparatus 10. In one form where the apparatus 10 is used for transporting the cutter of a large milling machine as previously mentioned, there are three sets of dual wheels 60 at each side of the rear frame 16 suitably connected to the frame 16 by a suspension system. In a commercial form, the frame 16 will also include a brake system, such as the pneumatic brake system indicated by the reference character 62 in FIG. 7, as well as a tool box 63, as shown in FIGS. 1 and 2.

The forward end 64 of the frame 16 is pivotally connected to a subframe 66 by pins 68 at the lower portion of the frame 16. The subframe 66 basically comprises a cross beam 70 and reinforcing 74. The pins 68 are arranged such that when the frame 16 is horizontal, the front end 64 of the frame 16 abuts the rear surface of the cross beam 70. A pair of turnbuckles 76 are pivotally connected between the upper end of the subframe 66 and the upper surface of the frame 16. The turnbuckles 76 are employed to equalize the weight on the wheels 60 of the frame 16 pursuant to the size of the load on the lifting and lowering frame 12. That is, when a large load is placed on the lifting and lowering frame 12, the load distribution on the wheels 60 may not be uniform, with the larger portion of the load being carried by the forward wheels 60. In such event, the turnbuckles 76 are extended to level out the frame 16 and more evenly distribute the weight among the various wheels 60.

A hydraulically actuated parallelogram 78 is pivotally interconnected between the rear, vertical columns 22 of the lifting and lowering frame 12 and the subframe 66. Each hydraulically actuated parallelogram 78 comprises upper and lower linkages 80a and 80b pivotally connected between the frame 12 and the subframe 66, along with a pair of double acting hydraulic cylinders 82, there being a hydraulic cylinder 82 and a pair of upper and lower linkages 80a and 80b at each side of the apparatus 10. As shown in FIG. 6, each hydraulic cylinder 82 is positioned at an angle to extend upwardly from the subframe 66, such that the respective end of the lifting and lowering frame 12 will be raised and lowered upon actuation of the hydraulically actuated cylinder 82.

As shown in FIG. 8, the hydraulic cylinders 52 are connected in parallel through one hand-operated valve 84 and the hydraulic cylinders 82 are connected in parallel through another manually operated valve 86. Hydraulic fluid is supplied to the valves 84 and 86 through a supply fitting 88 connected to a suitable source of supply (not shown) and a return fitting 90 connects both of the valves 84 and 86 to a suitable return tank (not shown). Thus, when the valve 84 is operated, the hydraulic cylinders 52 will be either extended or retracted in unison. Similarly, when the valve 86 is operated, the hydraulic cylinders 82 will be extended or retracted in unison. Thus, the lifting and lowering frame 12 can be suitably raised or lowered when desired.

As previously indicated, the apparatus 10 is particularly suited for the loading, transporting and unloading of the cutter mechanism of a large milling machine. In such an operation, the lifting and lowering frame 12 is lowered to the ground as shown in FIGS. 3, 9 and 10 with the first or forward transport frame 14 disconnected from a transporting tractor. The milling machine is then moved into a position over the apparatus 10 until a cutter assembly of the milling machine is centered over the lifting and lowering frame 12. The cutter assembly is then loaded onto the frame 12 and the milling machine is driven away. The valves 84 and 86 are then actuated to extend the hydraulic cylinders 52 and 82 for raising the lifting and lowering frame 12 sufficiently above the ground to provide a suitable clearance.

When the lifting and lowering frame 12 is raised, a load carrying link 92 is attached to the respective end of the lifting and lowering frame 12 and the respective end of the first and second frames 14 and 16 at the location of and parallel with each hydraulic cylinder 52 and 82. The links 92 are preferably permanently pinned to the respective end of the transport frame 14 or 16 and selectively pinned to the respective end of the lifting and lowering frame 12. When the links 92 are secured between the respective frames, they take the load off of the hydraulic cylinders 52 and 82. When not being used, the links 92 are unpinned from the respective ends of the lifting and lowering frame 12, and raised as shown in FIGS. 3, 9 and 10, where they can be suitably chained out of the way of the movement of the respective hydraulic cylinders and frame 12.

Changes may be made in the combination and arrangement of parts or elements as heretofore set forth in the specification and shown in the drawing without departing from the spirit and scope of the invention as defined in the following claims.

What is claimed is:

1. An apparatus for handling an object, comprising:
   a lifting and lowering frame having first and second ends adapted to support the object;
   first and second transport frames;
   a first hydraulically actuated parallelogram connecting the first transport frame to the first end of the lifting and lowering frame; said first hydraulically actuated parallelogram comprising a hydraulic cylinder and at least one pair of upper and lower parallel linkages, each of said linkages and said cylinder being pivotally connected to the first transport frame and the first end of the lifting and lowering frame;
   a second hydraulically actuated parallelogram connecting the second transport frame to the second end of the lifting and lowering frame; said second hydraulically actuated parallelogram comprising a hydraulic cylinder and at least one pair of upper and lower parallel linkages, each of said linkages and said cylinder being pivotally connected to the second transport frame and the second end of the lifting and lowering frame; and
   means for operating the hydraulically actuated parallelograms in unison, whereby the lifting and lowering frame may be raised and lowered in a horizontal plane with an angular orientation of the first and second transport frames with respect to the ground surface remaining unchanged.

2. An apparatus as defined in claim 1 further comprising:
   running gear supporting the second transport frame; and
   a hitch on the first transport frame.

3. An apparatus as defined in claim 2 further comprising a jack on the first transport frame.

4. An apparatus as defined in claim 2 wherein the second transport frame includes a main frame and a subframe pivotally connected between the main frame and the respective hydraulically actuated parallelogram, and a pair of turnbuckles pivotally connected between the main frame and the subframe to adjust the level of the main frame pursuant to the load on the lifting and lowering frame.

5. An apparatus as defined in claim 1 wherein each hydraulic cylinder is a double acting hydraulic cylinder.

6. An apparatus as defined in claim 5 wherein each hydraulically actuated parallelogram includes two pair of parallel linkages.

7. An apparatus as defined in claim 5 wherein each hydraulically actuated parallelogram includes a load carrying linkage adapted to be secured to the respective transport frame and the respective end of the lifting and lowering frame when the lifting and lowering frame is in a lifted position to take the load off of the respective hydraulic cylinder.

* * * * *